United States Patent [19]

Bottrell

[11] 4,333,018

[45] Jun. 1, 1982

[54] WIND ENERGY CONVERSION SYSTEM WITH REACTION TORQUE FOR POWER CONTROL

[75] Inventor: Gerald W. Bottrell, La Crescenta, Calif.

[73] Assignee: Ventus Energy Corp., Covina, Calif.

[21] Appl. No.: 167,043

[22] Filed: Jul. 9, 1980

Related U.S. Application Data

[63] Continuation-in-part of Ser. No. 853,395, Nov. 21, 1977, Pat. No. 4,219,308.

[51] Int. Cl.³ .............................................. F03D 7/04
[52] U.S. Cl. ...................................... 290/55; 290/44; 416/41
[58] Field of Search ................. 290/44, 55; 416/9, 12, 416/13, 15, 41, 43

[56] References Cited

U.S. PATENT DOCUMENTS

| | | | |
|---|---|---|---|
| 1,909,208 | 5/1933 | Miller | 290/55 X |
| 2,179,885 | 11/1939 | Fumagalli | 290/55 |
| 2,358,781 | 9/1944 | Albers | 416/41 A |
| 2,655,604 | 10/1953 | Hütter | 290/55 |
| 4,006,925 | 2/1977 | Scherer | 290/55 |
| 4,068,131 | 1/1978 | Jacobs et al. | 290/55 |

Primary Examiner—J. V. Truhe
Assistant Examiner—W. E. Duncanson, Jr.
Attorney, Agent, or Firm—Forrest E. Logan

[57] ABSTRACT

A wind energy conversion system for converting wind energy into controlled wind turbine torque comprising a wind turbine with an essentially horizontally disposed shaft, a means, rotatably mounted to a chassis, for sensing and reacting to wind turbine torque such that reaction torque acting on the means causes angular displacement of the means, a driven machine drivenly connected to the shaft of the wind turbine, and a means for adjusting wind turbine efficiency which is drivenly connected to the first mentioned means in such a way as to prevent continual angular speed thereof. Angular displacement of the first mentioned means provides the power for the last mentioned means to adjust wind turbine efficiency. Because the system can be designed so as to provide a substantially constant torque to the driven machine over a significant range of wind speeds, the system is particularly useful for generating electrical power suitable for transfer to an alternating current power network of an electrical utility company.

20 Claims, 6 Drawing Figures

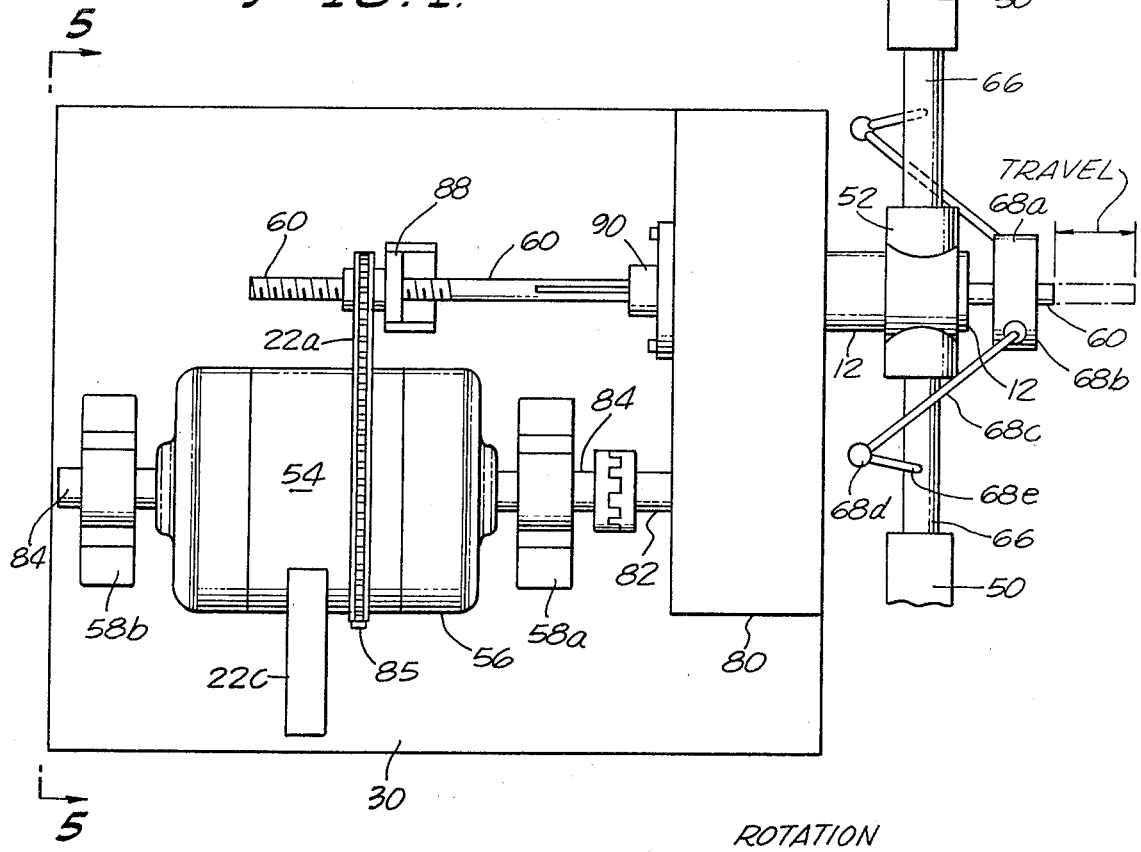
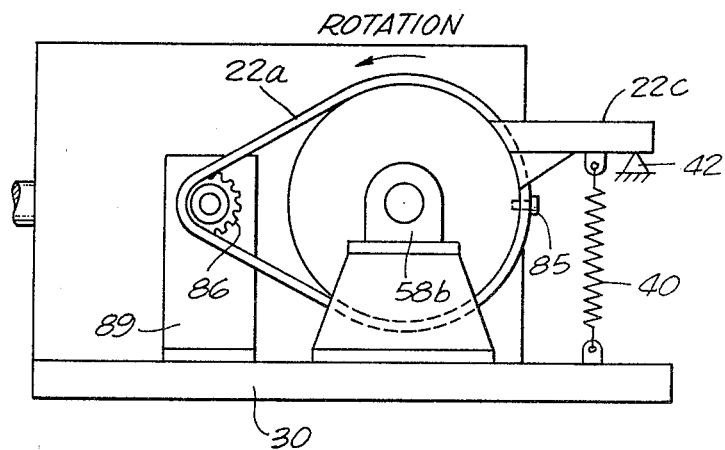
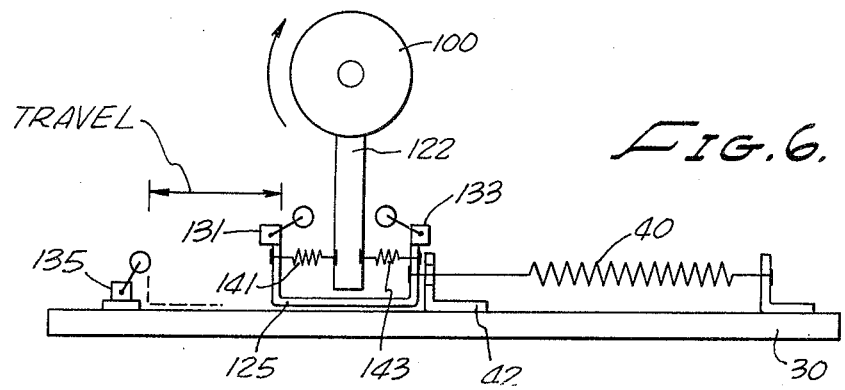

WIND ENERGY CONVERSION SYSTEM WITH REACTION TORQUE FOR POWER CONTROL

This is a continuation-in-part of Ser. No. 853,395, filed Nov. 21, 1977 now U.S. Pat. No. 4,219,308.

BACKGROUND OF INVENTION

As the world's supply of fossil fuels is further depleted, the need to harness the energy in the wind assumes ever increasing importance. Unfortunately, wide use of this clean, inexhaustible source of energy has not occured because of the high cost of wind energy conversion devices.

In order to hold size and cost of wind turbines, towers, and machinery within bounds, almost all wind energy conversion systems utilize a means to limit the effect of high winds on the device. The American farm windmill has a tail vane which, when triggered by wind speeds exceeding its maximum set point, turns 90 degrees to the turbine shaft in order to rotate the turbine out of the wind. The 4-arm Dutch windmill relies on manual furling of canvas sails to accomplish the same effect. These devices are simple and inexpensive, but all the energy in the high winds is wasted.

In the more sophisticated designs, various methods are used to regulate the output energy or torque or delivered power of the system to a substantially constant level for all wind speeds above a predetermined value, called "rated wind speed". This method allows economical design of the wind turbine, tower, and machinery while recovering a large portion of the energy available in the high speed winds.

Many systems have been developed to perform this important function. Unfortunately, those that perform well are very complex and expensive while the low-cost units are generally applicable only to very small wind energy conversion devices.

SUMMARY OF THE INVENTION

The present invention is for a wind energy conversion system which is efficient and effective while being simple, reliable, and relatively low cost.

In a further embodiment of this invention the system also provides a substantially constant level of output torque, or delivered power for all wind speeds above the rated wind speed of the system.

In a still further embodiment of this invention the system provides a means for preventing excessive output torque, or delivered power from occurring so as to prevent system damage at wind speeds which are greater than the system's capability or design with regard to operational or safety criteria.

This invention takes advantage of the principle that every action produces an equal and opposite reaction. For rotating machinery, this principle can be restated that every torque produces an equal and opposite reaction torque.

In general the invention is for a wind energy conversion system in which wind turbine efficiency, wind turbine torque, wind turbine power, delivered torque, or delivered power, or a combination thereof is adjusted or controlled by reaction torque. By reaction torque herein is meant torque which is in opposition to and a function of torque developed by the wind turbine.

In this invention, a wind turbine produces torque, or wind turbine torque, due to action of the wind, and wind turbine torque is transmitted to a driven machine, usually, although not necessarily, through a suitable speed increasing means. In other words, the driven machine is drivenly connected to the wind turbine. The reaction torque developed by the wind turbine acting on the driven machine, or load device, is utilized to sense the wind turbine torque magnitude and to provide the torque, or power, required to position a means for adjusting, or controlling, wind turbine efficiency, torque or power. A wide variety of wind turbine efficiency control means are known, including the following:

1. Blade pitch control, in which the pitch of the wind turbine blades is varied from an optimum value, thereby reducing the turning force of the wind on the turbine and causing a reduction in turbine efficiency.
2. Blade coning control, in which wind turbine blades are folded in a plane parallel to the turbine shaft, thereby reducing the area swept by the wind turbine and causing a reduction in turbine efficiency.
3. Yaw angle control, in which the wind turbine shaft is caused to turn at a horizontal angle to the wind direction, thereby reducing the driving force of the wind on the turbine and causing a reduction in turbine efficiency.
4. Vertical angle control, in which the wind turbine shaft is caused to tilt at a vertical angle to the wind direction, thereby reducing the driving force of the wind on the turbine and causing a reduction in turbine efficiency.

All of these means for adjusting wind turbine efficiency, or controlling wind turbine torque or power, are motivated by reaction torque in this invention. Therefore, this invention utilizes a reaction torque means drivenly connected to such wind turbine efficiency control means to adjust, or control, wind turbine torque, as will be further described below.

Reaction torque may be utilized in at least two manners:

1. A differential mechanism can be inserted between the wind turbine and the driven machine or load. Reaction torque is then available at a reaction shaft, or third shaft, of the differential mechanism.
2. The frame of the driven machine or equipment, or the frame of any component directly in the drive train of the system such as a speed increasing means, is mounted in such a manner that it is free to rotate through a limited angle.

Although such reaction shaft, or frame, is rotatable in response to reaction torque, it is connected to a means for adjusting, or controlling, wind turbine efficiency, torque, or power in such a way that the reaction shaft, or frame, is prevented from having continual angular speed. In other words, the reaction shaft, or frame, is permitted to rotate through a predetermined range of radians or degrees, for example 50°, but not permitted to continue to rotate. In other words, the means which is responsive to reaction torque can undergo angular displacement up to a predetermined number of degrees or radians, but is restricted from angular displacement in excess of the predetermined value.

The reaction torque is then transmitted by the reaction torque means, or in one embodiment by the reaction shaft, or in another embodiment by the rotatable frame of the driven machine, to the means for adjusting, or controlling, wind turbine efficiency.

The magnitude of the reaction torque can be equal to the torque of the wind turbine, the driven equipment, or if speed increasing or reducing means are employed, equal to neither but directly proportional to both.

This invention has the advantage when the driven machine is an electrical generator of enabling or allowing the generation and transmission of electrical power directly into electrical power lines without the need for batteries, chargers, inverters, or other power conditioning equipment.

The driven machine can be a generator. The generator can be any type but an induction generator is preferred because an induction generator facilitates wind turbine torque control by use of reaction torque particularly for small systems. An induction generator is easier to control, costs less to control, is cheaper to purchase, and has better reliability than a synchronous generator. However, an induction generator has a relatively poor power factor and therefore is slightly less efficient than a synchronous generator. Even though an induction generator has some disadvantages to a synchronous generator, the induction generator is preferred over the synchronous generator for relatively small wind energy conversion systems.

Regardless of the type of driven machine, or generator, one embodiment of this invention has the advantage when applied to fixed pitch multi-blade wind turbines, of enabling or allowing effective yaw angle control for a wide range of wind speeds above rated value.

A further embodiment of this invention which can be used with any of the various means for receiving and transmitting reaction torque, and any of the various means for adjusting or controlling wind turbine torque, comprises a means for sensing positive and negative torque magnitudes relative to a predetermined torque value corresponding to minimum "cut-in" wind speed. Another embodiment further comprises a means for sensing excessive or abnormal wind turbine torque magnitudes with respect to a predetermined torque value which corresponds to a maximum "cut-out" wind speed. In both of these embodiments the above means for sensing can be motivated by reaction torque or other sources of energy or power.

In general, this invention is for a wind energy conversion system comprising a wind turbine for converting wind energy into wind turbine torque. An essentially horizontally disposed, first shaft is drivenly connected at one end thereof to the wind turbine. A first means is provided for reacting to wind turbine torque in such a way that, when the system is operating, wind turbine torque produces, in balance thereto, angular displacement of the first means.

A chassis is provided to which the first means is rotatably mounted. By "rotatably mounted" herein is meant that the first means is not rigidly fixed to the chassis but is permitted to rotate. In one embodiment the axis of rotation of the first means is fixed in a specific location to the chassis.

In general, however, a driven machine is provided which is drivenly connected to the first shaft of the wind turbine and supported by the chassis. A second means for adjusting wind turbine efficiency is provided which is drivenly connected to the first means in such a way that the first means is prevented from having continual angular speed, and further in such a way that angular displacement of the first means causes the second means to adjust wind turbine efficiency. By preventing the first means from having continual angular speed, the first means is not permitted to rotate or spin continuously no matter how slow or fast such rotation may be.

In general, the system operates such that a change in reaction torque received by the first means causes the first means to undergo a change in angular displacement from its previously dynamically balanced position.

Therefore, the first means rotates in response to a change in reaction torque, which is caused by a change in wind turbine torque. The first means stops rotating when the new reaction torque is in dynamic balance with the system. The system is in dynamic balance when the second means, which is drivenly connected to the first means, has adjusted wind turbine efficiency so that the system is in dynamic balance with the new wind speed. If no change in the wind speed of the wind vector acting on the wind turbine occurs, the first means will, depending on the time constant and dampening of the system, come to rest and be in dynamic balance with the system.

In a preferred embodiment of this invention the driven machine is spaced away from the chassis by a support means. The support means rotatably supports the driven machine in such a way that the frame of the driven machine, or frame of any component directly in the drive train of the system, is angularly displaceable about input shaft. By the expression "frame of the driven machine" is meant the frame of any component or machine which is directly in the drive train, such as for example a speed increasing means. In this embodiment the support means is fixed to the chassis as well as supported by the chassis. The frame is spaced away from the chassis by the support means so that the frame of the driven machine is angularly displaceable with respect to said chassis.

An adjusting means for adjusting wind turbine efficiency is provided which is drivenly connected to the frame in such a way that the frame is prevented from having continual angular speed. The adjusting means is also drivenly connected to the frame in such a way that, when the system is in use, wind turbine torque produces, in balance thereto, angular displacement of the frame which in turn causes the adjusting means to adjust wind turbine efficiency.

In this embodiment the system operates so that a change in reaction torque, due to a change in wind magnitude, is transmitted to the frame of the driven machine, and causes the frame to undergo a change in angular displacement from its previous dynamically balanced position. The frame rotates to a new position which is in dynamic balance with the new wind speed. This dynamic balance is accomplished by an adjusting means which is drivenly connected to the frame, and which is designed to adjust the wind turbine efficiency so that the system is in dynamic balance with the new wind speed.

In an especially preferred embodiment the wind energy conversion system for converting wind energy into wind turbine torque comprises a wind turbine having blade pitch which is adjustable, an essentially horizontally disposed first shaft which is drivenly connected at one end thereof to the wind turbine, and a driven machine having an input shaft which is drivenly connected to the first shaft. A support means is provided for rotatably supporting the driven machine in such a way that the frame of the driven machine is angularly displaceable about the input shaft of the driven machine. A chassis is provided to which the support means is fixed. The frame of the driven machine is spaced away from the chassis by the support means so that the frame is angularly displaceable with respect to the chassis. An adjusting means is provided which is drivenly connected to the frame of the driven machine and supported by the chassis in such a way that said frame of the driven machine is prevented from having continual angular speed. The adjusting means is also drivenly connected to the frame of the driven machine in such a way that when the system is in use, wind turbine torque produces, in balance thereto, angular displacement of the frame of the driven machine which in turn causes the adjusting means to adjust blade pitch in such a way that wind turbine torque is controlled.

In this embodiment a change in wind magnitude causes a change in wind turbine torque, which causes a change in reaction torque, which causes the frame of the driven machine to undergo a change in angular displacement from its previous position. The new angular displacement of the frame of the driven machine causes through various linkages or devices, which can include a dampening means or proportional control means to prevent undesirable system oscillation, an adjustment of blade pitch so that the system comes in dynamic balance with the new wind magnitude.

In a further embodiment the driven machine is an electrical generator and the frame of the generator is angularly displaceable with respect to the chassis of the system. However, wind speed must exceed a predetermined lower value, which corresponds to a predetermined first value of wind turbine torque before angular displacement of the frame of the generator is permitted. When this embodiment of the system is in use, wind turbine torque which exceeds the predetermined first torque value produces, in balance thereto, angular displacement of the frame of the generator, which in turn causes the adjusting means to adjust blade pitch in such a way that wind turbine torque is adjusted to a predetermined second torque value which is substantially constant over a predetermined range of wind speeds. As in the previous embodiment, the "frame of the generator" is meant to include the frame of any component or machine which is directly in the drive train, such as for example the frame of a speed increasing means.

For the predetermined second torque value to be substantially constant over a predetermined range of wind speeds means that the wind turbine torque at cut-out wind speed must be nearly equal to wind turbine torque at rated wind speed. For example, at rated wind speed the wind turbine torque may equal 100 torque units which will increase gradually to about 104 torque units at cut-out wind speed. In this example, the cut-out torque is 4 percent higher than rated torque, and thus the wind turbine torque over the wind speed range illustrated is substantially constant. The increase in cut-out torque over rated torque may be higher or lower than the 4 percent of the example, but, in any event, the percent change should be small so that the wind turbine torque over the range of rated to cut-out wind speeds is substantially constant.

The range of wind speeds can be, for example, from the predetermined lower value or rated wind speed to a wind speed equal to at least two times the predetermined lower value wind speed. For example, the predetermined lower value wind speed can be 20 miles per hour (mph) and the predetermined range of wind speeds can be from 20 to at least about 40 mph. In this range of wind speeds, the system adjusts wind turbine efficiency in such a manner that wind turbine torque is substantially constant.

In another preferred embodiment, the predetermined range of wind speeds over which wind turbine torque is substantially constant is from a predetermined lower value to a wind speed equal to about four times the predetermined lower value. For example, the predetermined lower value wind speed can be 15 mph and the predetermined range of wind speeds over which wind turbine torque is essentially constant can be from about 15 to about 60 mph.

Preferably the predetermined second value of wind turbine torque is nearly equal to, but slightly greater than, the predetermined first value of wind turbine torque. For example, the predetermined first value of wind turbine torque corresponds to the rated wind speed which can be assigned a value of 100 torque units, and the predetermined second value of wind turbine torque corresponds to the wind speed between rated and cut-out wind speed which can correspond to a wind turbine torque range of between about 100 to 104 torque units. Thus, the average predetermined second value of wind turbine torque, in this example, is about 102 torque units which is slightly greater than the predetermined first value of wind turbine torque, or 100 torque units in this example.

In another embodiment of this invention the wind energy conversion system comprises a wind turbine for converting wind energy into wind turbine torque, and an essentially horizontally disposed first shaft, one end of which is drivenly connected to the wind turbine. A differential mechanism means is provided which has an input or second shaft drivenly connected to the first shaft, a power or third shaft for transmitting wind turbine torque to a driven machine, and a reaction or fourth shaft for transmitting a reaction torque to an adjusting means. The differential mechanism means is fixed to a chassis. The driven machine is fixed to the chassis and has an input shaft which is drivenly connected to the third shaft of the differential mechanism means. The adjusting means is drivenly connected to the fourth shaft in such a way that the fourth shaft is prevented from having continual angular speed. When the system is in use, wind turbine torque produces, in balance thereto, an angular displacement of said fourth shaft which in turn causes the adjusting means to adjust wind turbine efficiency. In this embodiment the system operates so that a change in reaction torque, due to a change in wind magnitude, is transmitted to the fourth shaft of the differential mechanism means, and causes the fourth shaft to undergo a change in angular displacement from its previous dynamically balanced position. The fourth shaft rotates to a new position which is in dynamic balance with the new wind speed. This dynamic balance is accomplished by an adjusting means which is drivenly connected to the fourth shaft, and which is designed to adjust the wind turbine efficiency so that it is in dynamic balance with the new wind speed.

In a further embodiment, the fourth shaft of the differential mechanism means is drivingly connected to a yaw control means in such a way that the fourth shaft is prevented from having continual angular speed. The yaw control means is supported by the chassis. When the system is in use, wind turbine torque produces, in balance thereto, angular displacement of the fourth shaft which in turn causes the yaw control means to adjust wind turbine yaw in such a way that wind turbine torque is controlled. Therefore, in this embodiment, when the fourth shaft rotates to a new position which is in dynamic balance with a new wind speed, the yaw control means, which is drivenly connected to the fourth shaft, adjusts wind turbine yaw so that wind turbine torque is in dynamic balance with the new wind speed.

In a still further embodiment, in which the driven machine is an electrical generator, wind speed which exceeds a predetermined first value, such as the rated wind speed, produces in balance thereto angular displacement of the fourth shaft of the differential mechanism means. The angular displacement of the fourth shaft which is drivingly connected to the yaw control means causes the yaw control means to adjust wind turbine yaw. In this embodiment wind turbine yaw is adjusted in such a way that wind turbine torque is adjusted to a predetermined second torque value which is substantially constant over a predetermined range of wind speeds. As in the earlier embodiment, this means that the wind turbine torque between rated and cut-out wind speeds is substantially constant. Wind turbine torque will increase slightly as the wind speed increases from rated to cut-out wind speed.

In another embodiment of the present invention, a wind turbine having blade pitch which is adjustable is drivingly connected to a horizontally disposed first shaft which is drivenly connected to the input or second shaft of the differential mechanism means. As in the previous embodiment, the power or third shaft of the differential mechanism is drivingly connected to a driven machine. The reaction or fourth shaft of the differential mechanism means, however, is drivingly connected to an adjusting means for adjusting blade pitch of the wind turbine, thereby controlling wind turbine torque. In this embodiment a change in wind speed causes a change in the angular displacement of the fourth shaft of the differential mechanism means, which in turn causes movement of the adjusting means, which in turn causes blade pitch to be adjusted, thereby controlling wind turbine torque.

In all embodiments of the present invention, a speed increasing means may be inserted in the drive train of the system between the first shaft of the wind turbine and the input shaft of the driven machine. In the embodiments using a differential mechanism means, the speed increasing means can be an integral part of the differential mechanism means.

In a preferred embodiment wind turbine torque is controlled so that it is substantially constant for all wind speeds between a first predetermined wind speed and a second predetermined wind speed which is at least two times greater than the first predetermined wind speed. For example, the range of wind speeds can be between rated and cut-out wind speed. In a still further embodiment the second predetermined wind speed is about four times greater than the first predetermined wind speed, while the wind turbine torque within such a range of wind speeds is maintained essentially constant.

In these embodiments the speed of the input shaft of the driven machine or generator is directly proportional to the speed of the wind turbine shaft or first shaft as referred to herein.

In further embodiments of the above-described embodiments, neither the first means for reacting to wind turbine torque and the second means for adjusting wind turbine efficiency; nor the frame of the driven machine or generator and the adjusting means drivenly connected to the frame; nor the reaction shaft, or fourth shaft as referred to herein, of the differential mechanism means and the adjusting means, or yaw control means, drivenly connected to the fourth shaft, are elements of the drive train of the system.

In another further embodiment of the present invention there is provided a connecting means for transmitting electrical power from the generator into an electrical power source, and a breaking means for breaking electrical connection between the generator and the power source when the wind turbine torque is less than a predetermined absorbing torque value required for transmitting electrical power from the generator to the power source. In this embodiment when the wind speed is less than cut-in wind speed, the system is not able to generate sufficient voltage for feasible or economical transfer of power to the electrical power source, and therefore a breaking means is used to prevent the power source from causing the wind turbine to motor. In a still further embodiment an excessive wind speed means is provided which reduces the drag on the wind turbine when the wind speed exceeds a predetermined high value, which corresponds to predetermined high torque value, which could cause damage to the system if the system were to be allowed to continue operation in its normal mode.

If needed or desired, a suitable dampening means, proportional control, or the like can be added to the system to reduce any system oscillation.

In general the system is rotatably mounted on a support structure so that it normally faces directly into the wind, at least for all wind speeds no greater than rated wind speed. Furthermore, an aerodynamic shroud can be used to enclose the various components of the system to protect such components from the weather and to reduce drag on the structure which is not beneficially converted into useful torque.

Other objectives and features of the present invention will become apparent from a detailed description and consideration of the preferred embodiments thereof taken in conjunction with the accompanying drawings in which like elements or parts have like numerals throughout the several views and embodiments.

DESCRIPTION OF THE DRAWINGS

FIG. 4 is a top view showing schematically a third embodiment of the present invention which also uses a driven machine having a rotatable frame and adjustable blade pitch to control wind turbine torque.

FIG. 5 is an end view of FIG. 4.

FIG. 6 is a schematic diagram of a reaction torque mechanism showing a method of preloading the reaction torque arm and sensing torque magnitude.

DETAILED DESCRIPTION OF THE PREFERRED EMBODIMENTS

Figure 1:
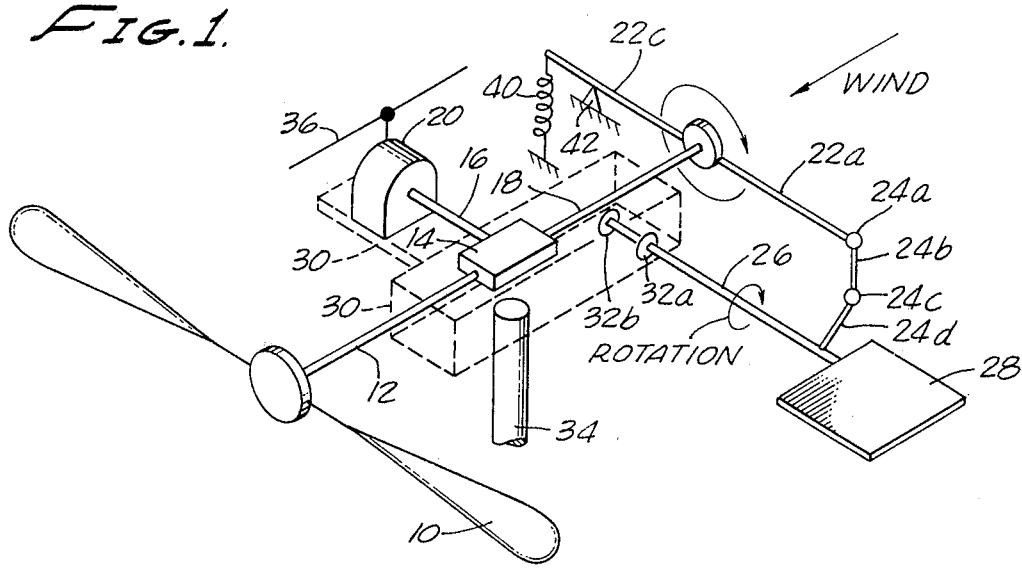
FIG. 1 is a schematic view showing one embodiment of the present invention using a differential mechanism means and a yaw angle control means to control wind turbine torque.

FIG. 1 shows a schematic view of one embodiment of the present invention which uses a differential mechanism means to sense and respond to reaction torque and a yaw control means drivenly connected to the differential mechanism means to adjust the efficiency of the wind turbine system.

In particular, wind turbine 10 is coupled to an essentially horizontally disposed first shaft 12 which is also the input shaft to differential mechanism means 14 which has an output power shaft 16 and reaction torque shaft 18. Output power shaft 16 is also the input shaft to driven machine 20 which can be an electrical generator. Reaction torque shaft 18 is drivingly connected to torque arm 22a. Differential mechanism means 14 is mounted on chassis 30 shown in phantom detail for aiding this description.

Torque arm 22a is drivingly coupled to yaw control vane arm 26 by means of suitable yaw linkage mechanism 24 which comprises elements 24a, 24b, 24c and 24d. Yaw control vane 28 is drivenly attached to yaw control vane arm 26 which is free to rotate on bearings 32a and 32b which are mounted on chassis 30. Chassis 30 is free to rotate (not shown) on support tower 34. Chassis 30 therefore carries the entire mechanism and is rotatably mounted atop support tower 34.

In this embodiment the driven machine 20 is shown as an alternating current generator which transmits electrical energy directly into power line 36.

Torque arm 22c is preloaded by a means comprising spring 40 and stop 42.

In this embodiment the wind turbine is normally oriented downwind of the tower, so that wind forces acting on the wind turbine create a drag which keeps the wind turbine directed into the wind. Other methods of keeping the wind turbine directed into the wind can be used if desired. Yaw control vane 28 is normally oriented parallel to the wind, as shown in FIG. 1, so that the wind exerts a negligible force on it.

As the wind speed increases, generator 20 is energized and begins supplying power directly into power line 36 and a retarding or reaction torque is created which is transmitted through the reaction shaft 18 to the yaw control means comprising elements 26 and 28, and linkage mechanism 24. The yaw control means is, in this embodiment, designed to maintain the wind turbine system at constant or nearly constant torque.

As the developed wind turbine torque exceeds the set point, which is predetermined by the design of spring 40 and stop 42, the reaction torque exerted through torque arm 22c overcomes the retarding torque represented by preloading spring 40 and begins to rotate, that is, undergo angular displacement. Springs 40 and 42 are fixed (not shown) to the chassis 30. Rotation of torque arm 22a is translated through linkage mechanism 24 which causes yaw control arm 26 and vane 28 to rotate, thereby presenting a greater surface area of yaw control vane 28 to the wind. The force of the wind acting on yaw control vane 28 causes the entire assembly to partially rotate out of the wind until a point is reached in which the developed wind turbine torque is reduced to, or slightly above, a predetermined value or rated value which corresponds to the set point value represented by spring 40 and stop 42.

The differential mechanism means shown in FIG. 1 shows three distinct shafts for connection to the wind turbine, generator, and torque arm. The differential mechanism means can be a bevel gear type, planetary gear type, or a type employing chains and sprockets or belts and pulleys. The depicted shafts represent the three power connections normally available in such a differential mechanism means.

With slow-turning wind turbines, a speed increasing means is often desired or required. Although a speed increasing means is not shown in FIG. 1, this device could be located between wind turbine 10 and differential mechanism means 14, or between the differential mechanism and generator 20. The speed increasing means can be separate or integral with the differential mechanism means.

In this embodiment of the present invention, a wind coming from the direction shown in FIG. 1 creates a drag on the wind turbine which tends to keep the wind turbine oriented downstream but directed into the wind. Rotation of the wind turbine causes rotation of power shaft 16 and generation of electrical power by generator 20. Reaction torque is sensed by reaction shaft 18. As the wind speed increases reaction torque increases, but reaction torque arm 22c remains seated against stop 42 due to the force of spring 40 until the reaction torque is greater than that exerted by spring 40. The point where reaction torque and the torque exerted by spring 40 are equal is the "rated" torque of the wind turbine system which corresponds to the "rated" wind speed. As the wind speed exceeds rated wind speed, torque arm 22a rotates a limited amount in the direction shown in FIG. 1. The angular displacement of torque arm 22a causes, through linkage mechanism 24, yaw control arm 26 to rotate in the direction shown, thereby causing yaw control vane 28 to present more of its surface to the wind. The drag exerted on yaw control vane 28 causes the wind turbine to be partially rotated out of the wind to a point where the wind speed which exceeds rated wind speed is in dynamic balance with the system. Dynamic balance results in a controlling of wind turbine torque so that it is just slightly greater than rated torque for all wind speeds greater than rated wind speed. It will be appreciated that as wind speed increases to a much greater extent over rated wind speed, the wind turbine must rotate to a larger degree out of the wind in order for the system to maintain wind turbine torque substantially constant, that is just slightly greater than rated torque.

Figure 2:
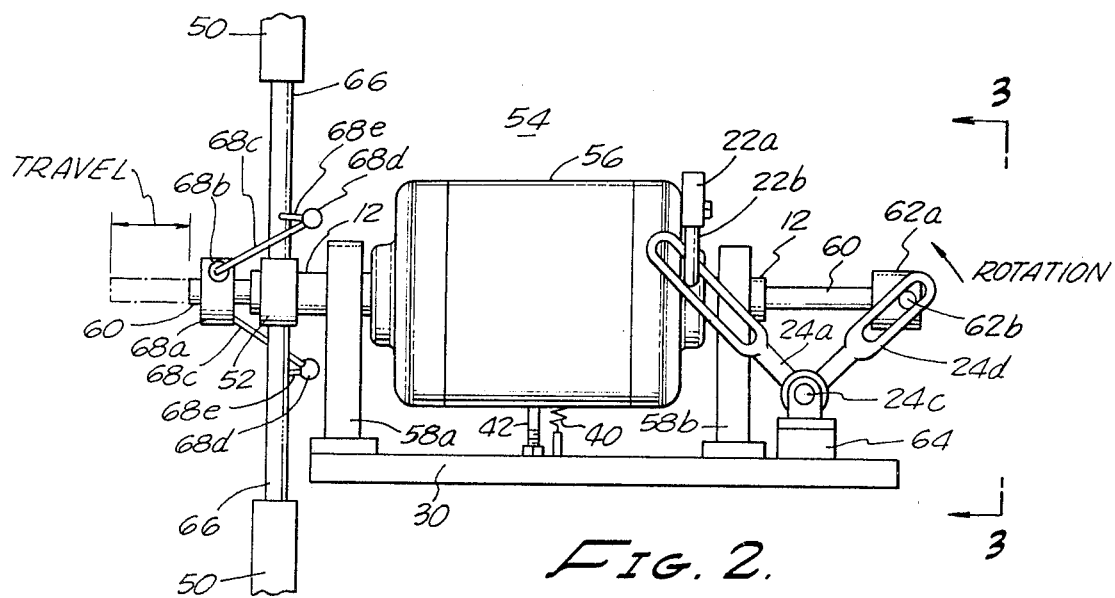
FIG. 2 is a side view showing another embodiment of the present invention using a driven machine having a rotatable frame and adjustable blade pitch to control wind turbine torque.
Figure 3:
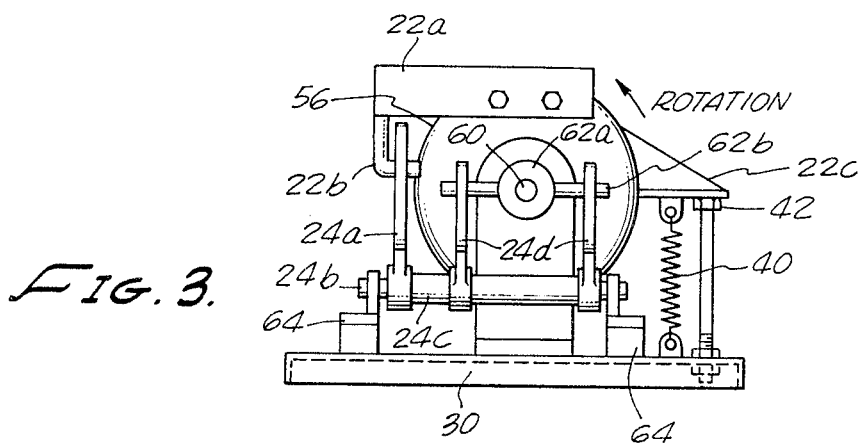
FIG. 3 is an end view of the embodiment of FIG. 2.

FIGS. 2 and 3 illustrate a physical arrangement of a wind turbine with variable pitch blades 50 supported from a central hub 52 which is direct coupled to the shaft 12 of a generator 54. Generator frame 56 is free to rotate by means of a special mounting arrangement in which the generator front and rear shaft extensions are separately and rotatably supported by pedestal bearings 58a and 58b which are fixed to chassis 30. Generator shaft 12 is hollow to accept control rod 60 which extends through the center of generator shaft 12 and protrudes therefrom at both ends.

On the rear of control rod 60 is fitted an idler bearing 62 which allows control rod 60 to be moved into and out of generator shaft 12 by action of torque arm 22a, fastened to rotatable generator frame 56. Torque arm unit 22 comprises right angle element 22b which is slidingly and drivingly connected to linkage mechanism element 24a. Linkage mechanism 24 comprises elements 24a, 24b, 24c and 24d, which is slidingly and drivingly connected to pin element 62b which is fixed to annular element 62a of idler bearing 62. Therefore, torque arm 22 and idler bearing 62 are coupled by means of a linkage mechanism 24 which is supported by bearings 64 which are mounted to chassis 30.

The turbine end of control rod 60 is fastened to rotatable blade spars 66 through linkage mechanism 68 which comprises elements 68a, 68b, 68c, 68d and 68e, thus allowing spars 66 to be rotated and blade pitch to be altered as the axial position of control rod 60 is changed in response to movement torque arm 22.

In the embodiment shown in FIGS. 2 and 3, torque arm 22c of this arrangement is preferably preloaded by means of spring 40 and stop 42 similar to those elements shown in FIG. 1. Preferably stop 42 is adjustable.

In this embodiment drag on the wind turbine tends to keep the wind turbine oriented downstream but directed into the wind. As the wind speed exceeds rated wind speed, torque arm element 22c rotates slightly off of stop 42. Torque arm element 22b which is slidingly and drivingly connected to linkage mechanism 24 rotates linkage mechanism 24 in the direction shown in FIG. 2. Idler bearing 62 which is drivenly connected to linkage mechanism 24 is drivingly connected to control rod 60 which is drivingly connected to rotatable blade spars 66 through linkage mechanism 68. Blade spars 66 change blade pitch (not shown on FIGS. 2 and 3) to a point where wind turbine torque is in dynamic balance with the system and wind speed acting on the system. Dynamic balance results in a controlling of wind turbine torque so that it is just slightly greater than rated torque for all wind speeds greater than rated wind speed. As wind speed increases the efficiency of the wind turbine is therefore decreased by blade pitch adjustment so as to maintain wind turbine torque substantially constant; that is, just slightly greater than rated torque. Therefore, this embodiment operates to change the pitch of the wind turbine blades when the torque applied to the generator exceeds rated torque.

Furthermore, in this embodiment the frame of a driven machine in the driven train, specifically the frame of the generator, senses and transmits reaction torque to an adjusting means which adjusts wind turbine efficiency, specifically by adjusting the blade pitch of the wind turbine.

FIG. 2 depicts a small wind turbine in which the speed thereof is high enough to drive the generator directly. For larger slower-speed wind turbines, speed increasing devices can be inserted between the turbine and generator, in which case only the low speed turbine shaft need be hollow to accept the pitch changing control rod.

FIGS. 4 and 5 illustrate another embodiment of the present invention in which reaction torque, sensed and transmitted by a component in the drive train of the system, is used to drive an adjusting means which adjusts wind turbine efficiency by adjusting the blade pitch of the wind turbine.

This embodiment, which may be oriented into the wind as in the embodiment of FIG. 1, has first shaft 12 which is drivenly connected to the wind turbine. A speed increasing means 80 is drivenly connected to the first shaft. An output shaft 82 of the speed increasing means is coupled to input shaft 84 of generator 54. The details of the gear mechanism or the like between shaft 12 and 82 are not shown since any suitable means known to those skilled in the art can be used. The shaft of generator 54 extends through the generator and is rotatably mounted in pedastal bearings 58a and 58b which are mounted on chassis 30. Generator frame 56 is free to rotate relative to the chassis.

As wind speed exceeds rated wind speed, frame 56 rotates slightly in the direction shown in FIG. 5 causing torque arm 22c to lift off stop 42. Spring 40 prevents rotation of frame 56 for all wind speeds less than rated wind speed which corresponds to rated wind torque. As frame 56 rotates so does torque arm 22a which in this embodiment is a chain fastened to frame 56 by fastening means 85. Chain 22a is drivingly connected to sprocket 86 which is permitted to rotate but not permitted to have substantial axial movement by bearing means 88 which is contained in bearing mount 89 which is mounted to chassis 30. Rotation of sprocket 86 causes control rod 60 to move axially through the hollow shaft of wind turbine shaft 12. Rotation of control rod 60 is prevented by spline means 90. Control rod 60 is drivingly connected to rotatable blade spars 66 through linkage mechanism 68 which changes blade pitch (not shown in FIGS. 4 and 5) to a point where wind turbine torque is in dynamic balance with the system and wind speed acting on the system.

As in the embodiment shown in FIGS. 2 and 3, the embodiment in FIGS. 4 and 5 of the present invention adjust the blade pitch of the wind turbine for all wind speeds greater than rated wind speed which corresponds to rated wind torque so that wind turbine torque is just slightly greater than rated wind turbine torque and is substantially constant over all wind speeds between rated and cut-out wind speed.

Another embodiment of the present invention is similar to the embodiments shown in FIGS. 2 and 4 except that a means for rotatably supporting the frame of the driven machine or generator is provided which is different than that shown in FIGS. 2 and 4. In this embodiment, instead of using pedestal bearings to support the shaft of the driven machine or generator, a pedestal bearing or bearings can be used to directly support the frame of the driven machine or generator rather than the shaft thereof. This embodiment has the advantage of not subjecting the pedestal bearing to the constant and relatively high-speed rotation of the shaft, but rather the intermittent and slight rotational motion of the frame. Although bearing life is enhanced in this embodiment this design is more costly to construct and therefore is not preferred where a cheaper initial investment is of principal concern.

If desired or necessary, all embodiments of the present invention can have as a further embodiment a dampening means, proportional control means, or the like, to prevent undesirable system oscillation as the various control means react to a change in wind speed. Such means are additionally beneficial when wind speeds are varying rapidly. Dampening means can be, for example, a shock absorber means, or dash pot, working in parallel with spring means 40.

FIG. 6 depicts schematically a further embodiment of the present invention which can be used with all the embodiments set forth above. A torque arm 122 is rigidly connected to a reaction torque device 100 which can be either a rotatable frame of the driven machine, such as frame 56 in FIGS. 2 and 4, or the reaction shaft of a differential mechanism means, such as reaction shaft 18 in FIG. 1. Cradle device 125, preloaded by means of spring 40 and stop 42, allows torque arm 122 some freedom to move clockwise or counterclockwise. When the reaction torque on torque arm 122, acting on cradle device 125, exceeds that exerted by large spring 40, cradle device 125 is free to move to the left, to position the particular turbine efficiency control means employed. For example, to position a yaw control vane as in the embodiment of FIG. 1, or blade pitch as in the embodiment of FIGS. 2 and 4.

When the wind turbine produces "positive" torque, torque arm 122 moves clockwise to trip switch 131.

When the torque arm turns counterclockwise, the turbine is being driven by the load device and switch 133 is tripped. Switch 131 can be used to make connection with an electrical power source thus allowing electrical connection when the wind speed reaches cut-in wind speed which corresponds to cut-in wind turbine torque. Switch 133 can be used to break the electrical connection with the electrical power source when wind speed is below cut-in wind speed which corresponds to cut-in wind turbine torque thereby preventing the generator from acting as a motor to drive the turbine.

Increases in wind speed are acceptable until the maximum safe torque of the generator or other system components is approached. Therefore, when the system is exposed to excessive wind speed and an excessive torque is produced by the wind turbine, switch 135 is actuated by the cradle device 125. Switch 135 can be used to initiate feathering of the wind turbine to prevent its operation when the wind speed becomes excessive and the system becomes unsafe or the torque exceeds the maximum safe design level for the generator or other system components or the like. By feathering the wind turbine is meant any method which essentially drastically reduces the drag on the wind turbine, such as for example, blade coning or vertical rotation of the entire wind turbine system.

Small springs 141 and 143 may be attached between cradle device 125 and torque arm 122 to prevent operation of switches 131 and 133 until the positive and negative torques are of the desired magnitude.

The switches depicted may be electrical, mechanical, or pneumatic. The switches can be used to indicate, or to initiate control functions, when the wind turbine is producing torque, absorbing torque or producing excessive torque.

Although the present invention has been described with reference to the preferred embodiments thereof, many modifications and alternations may be made, and equivalents employed, within the scope of the appended claims without departing from the spirit or sacrificing any of the advantages of the present invention.

What is claimed is:

1. A wind energy conversion system comprising:
a wind turbine for converting wind energy into wind turbine torque; an essentially horizontally disposed first shaft, one end of which is drivenly connected to said wind turbine; a first means for reacting to wind turbine torque in such a way that, when said system is in use, wind turbine torque produces, in balance thereto, angular displacement of said first means; a chassis to which said first means is rotatably mounted; a driven machine drivenly connected to said first shaft and supported by said chassis; and a second means for adjusting wind turbine efficiency, said second means being drivenly connected to said first means in such a way that said first means is prevented from having continual angular speed, and further in such a way that angular displacement of said first means causes said second means to adjust wind turbine efficiency.

2. A wind energy conversion system comprising:
a wind turbine for converting wind energy into wind turbine torque; an essentially horizontally disposed first shaft, one end of which is drivenly connected to said wind turbine; a driven machine having an input shaft drivenly connected to said first shaft and having a frame; a support means for rotatably supporting said driven machine in such a way that said frame is angularly displaceable about said input shaft; a chassis to which said support means is fixed, said frame being spaced away from said chassis by said support means so that said frame is angularly displaceable with respect to said chassis; and an adjusting means drivenly connected to said frame for adjusting wind turbine efficiency in such a way that said frame is prevented from having continual angular speed, and, when said system is in use, wind turbine torque produces, in balance thereto, angular displacement of said frame which in turn causes said adjusting means to adjust wind turbine efficiency.

3. A wind energy conversion system comprising:
a wind turbine for converting wind energy into wind turbine torque, said wind turbine having blade pitch which is adjustable; an essentially horizontally disposed first shaft, one end of which is drivenly connected to said wind turbine; a driven machine having an input shaft drivenly connected to said first shaft and having a frame; a support means for rotatably supporting said driven machine in such a way that said frame is angularly displaceable about said input shaft;
a chassis to which said support means is fixed, said frame being spaced away from said chassis by said support means so that said frame is angularly displaceable with respect to said chassis; and an adjusting means drivenly connected to said frame and supported by said chassis, said adjusting means for adjusting blade pitch in such a way that said frame is prevented from having continual angular speed, and, when said system is in use, wind turbine torque produces, in balance thereto, angular displacement of said frame which in turn causes said adjusting means to adjust blade pitch in such a way that wind turbine torque is controlled.

4. A wind energy conversion system comprising:
a wind turbine for converting wind energy into wind turbine torque, said wind turbine having blade pitch which is adjustable; an essentially horizontally disposed first shaft, one end of which is drivenly connected to said wind turbine; a generator having an input shaft drivenly connected to said first shaft and having a frame; a support means for rotatably supporting said generator in such a way that said frame is angularly displaceable about said input shaft; a chassis to which said support means is fixed, said frame being spaced away from said chassis by said support means so that said frame is angularly displaceable with respect to said chassis; and an adjusting means drivenly connected to said frame and supported by said chassis, said adjusting means for adjusting blade pitch in such a way that said frame is prevented from having continual angular speed, and, when said system is in use, wind turbine torque which exceeds a predetermined first value, produces, in balance thereto, angular displacement of said frame, which in turn causes said adjusting means to adjust blade pitch in such a way that wind turbine torque is adjusted to a predetermined second value which is substantially constant over a predetermined range of wind speeds.

5. A wind energy conversion system comprising:
a wind turbine for converting wind energy into wind turbine torque; an essentially horizontally disposed first shaft, one end of which is drivenly connected to said wind turbine; a differential mechanism means having a second shaft drivenly connected to said first shaft, a third shaft for transmitting wind turbine torque, and a fourth shaft for transmitting a reaction torque; a chassis to which said differential mechanism means is fixed; a driven machine having an input shaft drivenly connected to said third shaft and fixed to said chassis; and an adjusting means drivenly connected to said fourth shaft for adjusting wind turbine efficiency in such a way that said fourth shaft is prevented from having continual angular speed, and, when said system is in use, wind turbine torque produces, in balance thereto, angular displacement of said fourth shaft which in turn causes said adjusting means to adjust wind turbine efficiency.

6. A wind energy conversion system comprising: a wind turbine for converting wind energy into wind turbine torque; an essentially horizontally disposed first shaft, one end of which is drivenly connected to said wind turbine; a differential mechanism means having a second shaft drivenly connected to said first shaft, a third shaft for transmitting wind turbine torque, and a fourth shaft for transmitting a reaction torque; a chassis to which said differential mechanism means is fixed; a driven machine having an input shaft drivenly connected to said third shaft and fixed to said chassis; and a yaw control means drivenly connected to said fourth shaft and supported by said chassis, said yaw control means for adjusting wind turbine yaw in such a way that said fourth shaft is prevented from having continual angular speed, and, when said system is in use, wind turbine torque produces, in balance thereto, angular displacement of said fourth shaft which in turn causes said yaw control means to adjust wind turbine yaw in such a way that wind turbine torque is controlled.

7. A wind energy conversion system comprising: a wind turbine for converting wind energy into wind turbine torque; an essentially horizontally disposed first shaft, one end of which is drivenly connected to said wind turbine; a differential mechanism means having a second shaft drivenly connected to said first shaft, a third shaft for transmitting wind turbine torque, and a fourth shaft for transmitting a reaction torque; a chassis to which said differential mechanism means is fixed; a generator having an input shaft drivenly connected to said third shaft and fixed to said chassis; and a yaw control means drivenly connected to said fourth shaft and supported by said chassis, said yaw control means for adjusting wind turbine yaw in such a way that said fourth shaft is prevented from having continual angular speed, and, when said system is in use, wind turbine torque which exceeds a predetermined first value, produces, in balance thereto, angular displacement of said fourth shaft which in turn causes said yaw control means to adjust wind turbine yaw in such a way that wind turbine torque is adjusted to a predetermined second value which is substantially constant over a predetermined range of wind speeds.

8. A wind energy conversion system comprising: a wind turbine for converting wind energy into wind turbine torque, said wind turbine having blade pitch which is adjustable, an essentially horizontally disposed first shaft, one end of which is drivenly connected to said wind turbine; a differential mechanism means having a second shaft drivenly connected to said first shaft for receiving power from said wind turbine, a third shaft for transmitting wind turbine torque, and a fourth shaft for transmitting a reaction torque; a chassis to which said differential mechanism means is fixed; a driven machine having an input shaft drivenly connected to said third shaft and fixed to said chassis; and an adjusting means drivenly connected to said fourth shaft for adjusting blade pitch in such a way that said fourth shaft is prevented from having continual angular speed, and, when said system is in use, wind turbine torque produces, in balance thereto, angular displacement of said fourth shaft which in turn causes said adjusting means to adjust blade pitch in such a way that wind turbine torque is controlled.

9. The system of claim 1, 2, 3, 5, 6 or 8 wherein wind turbine torque is substantially constant for all wind speeds between a first predetermined wind speed and a second predetermined wind speed which is at least two times greater than said first predetermined wind speed.

10. The system of claim 1 wherein said driven machine has an input shaft and wherein the speed of said first shaft is directly proportional to the speed of said input shaft of said driven machine.

11. The system of claim 2, 3, 4, 5, 6, 7 or 8 wherein the speed of said first shaft is directly proportional to the speed of said input shaft.

12. The system of claim 1 wherein said wind energy conversion system has a drive train which consists only of those elements drivenly connecting said driven machine to said wind turbine, and said first means and said second means are not elements of said drive train.

13. The system of claim 2 or 3 wherein said wind energy conversion system has a drive train which consists only of those elements drivenly connecting said driven machine to said wind turbine, and said frame and said adjusting means are not elements of said drive train.

14. The system of claim 4 wherein said wind energy conversion system has a drive train which consists only of those elements drivenly connecting said generator to said wind turbine, and said frame and said adjusting means are not elements of said drive train.

15. The system of claim 5 or 8 wherein said wind energy conversion system has a drive train which consists only of those elements drivenly connecting said driven machine to said wind turbine, and said fourth shaft and said adjusting means are not elements of said drive train.

16. The system of claim 6 wherein said wind energy conversion system has a drive train which consists only of those elements drivenly connecting said driven machine to said wind turbine, and said fourth shaft and said yaw control means are not elements of said drive train.

17. The system of claim 7 wherein said wind energy conversion system has a drive train which consists only of those elements drivenly connecting said generator to said wind turbine, and said fourth shaft and said yaw control means are not elements of said drive train.

18. The system of claim 4 or 7 further comprising a connecting means for transmitting electrical power from said generator into an electrical power source; a breaking means for breaking electrical connection between said generator and said electrical power source when wind turbine torque is less than a predetermined absorbing torque value required for transmitting electrical power from said generator to said electrical power source; and an excessive wind means for preventing wind turbine torque from exceeding a predetermined high torque value.

19. The system of claim 1 further comprising a support structure to which said chassis is rotatably mounted.

20. The system of claim 2, 3, 4, 5, 6, 7 or 8 further comprising a speed increasing means for increasing the speed of said input shaft, said speed increasing means being inserted between said first shaft and said input shaft.

* * * * *